No. 716,364. Patented Dec. 23, 1902.
F. BAYERDOERFER.
SPEED RECORDING APPARATUS.
(Application filed Feb. 27, 1902.)
(No Model.) 4 Sheets—Sheet 1.
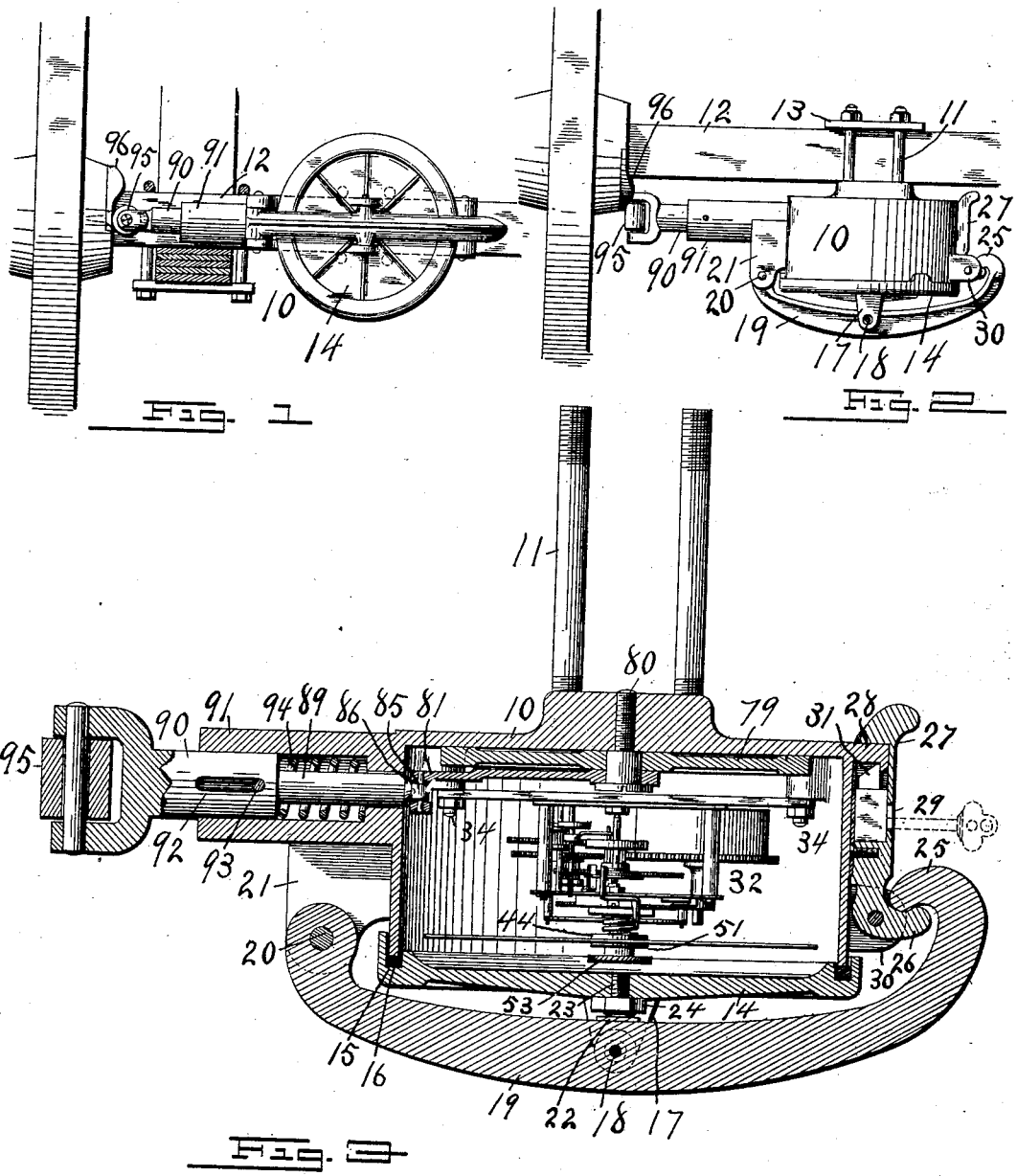
WITNESSES:
INVENTOR
Frank Bayerdoerfer,
BY
W. B. Hutchinson,
ATTORNEY No. 716,364. Patented Dec. 23, 1902.
F. BAYERDOERFER.
SPEED RECORDING APPARATUS.
(Application filed Feb. 27, 1902.)
(No Model.) 4 Sheets—Sheet 2.

WITNESSES: INVENTOR.
Wm H Canfield Jr. Frank Bayerdoerfer,
M R Conley BY
W. B. Hutchinson
ATTORNEY No. 716,364. Patented Dec. 23, 1902.
F. BAYERDOERFER.
SPEED RECORDING APPARATUS.
(Application filed Feb. 27, 1902.)
(No Model.) 4 Sheets—Sheet 3.
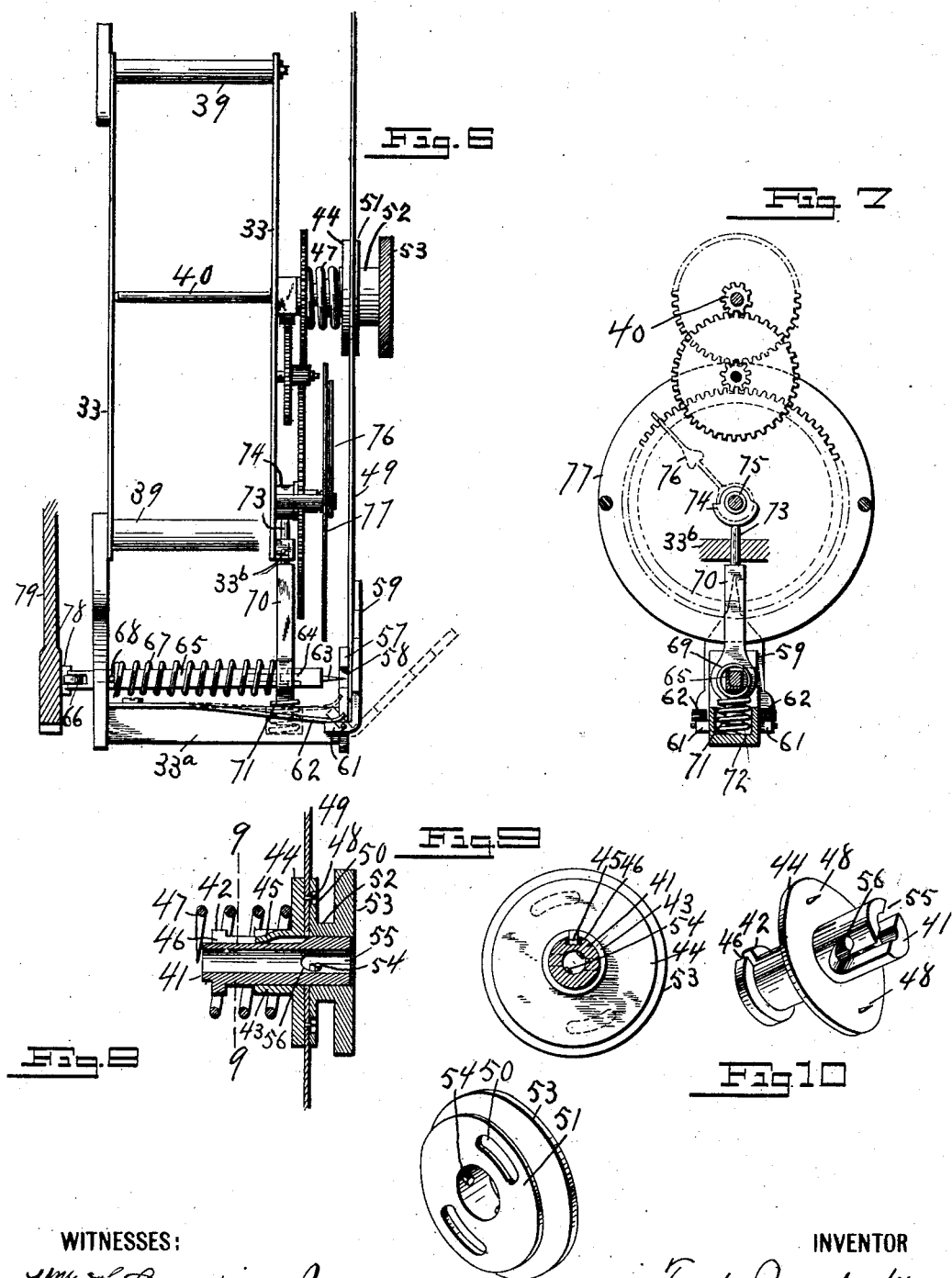
WITNESSES:
INVENTOR
Frank Bayerdoerfer.
BY
ATTORNEY No. 716,364. Patented Dec. 23, 1902.
F. BAYERDOERFER.
SPEED RECORDING APPARATUS.
(Application filed Feb. 27, 1902.)
(No Model.) 4 Sheets—Sheet 4.

WITNESSES:

INVENTOR
Frank Bayerdoerfer,
BY
ATTORNEY

UNITED STATES PATENT OFFICE.

FRANK BAYERDOERFER, OF NEW YORK, N. Y., ASSIGNOR TO PETER WHITNEY, OF NEW YORK, N. Y.

SPEED-RECORDING APPARATUS.

SPECIFICATION forming part of Letters Patent No. 716,364, dated December 23, 1902.

Application filed February 27, 1902. Serial No. 95,927. (No model.)

*To all whom it may concern:*

Be it known that I, FRANK BAYERDOERFER, of New York, county of Kings, State of New York, have invented certain new and useful Improvements in Speed-Recording Apparatus, of which the following is a full, clear, and exact description.

My invention relates to improvements in speed-recording apparatus of the kind shown in Letters Patent of the United States, No. 682,447, issued to me on September 10, 1901, and which apparatus is used in recording the speed of vehicles of various kinds.

The object of my present invention is to improve certain features of construction in the machine covered by my former patent, to the end that the apparatus may be easier of manipulation, surer in operation, and generally more durable, convenient, and accurate.

With these ends in view my invention consists of certain features of construction and combinations of parts, which will be hereinafter particularly described, differentiated from the structure of my former invention, and claimed.

Reference is to be had to the accompanying drawings, forming part of this specification, in which similar figures of reference refer to similar parts throughout the several views.

Figure 4:
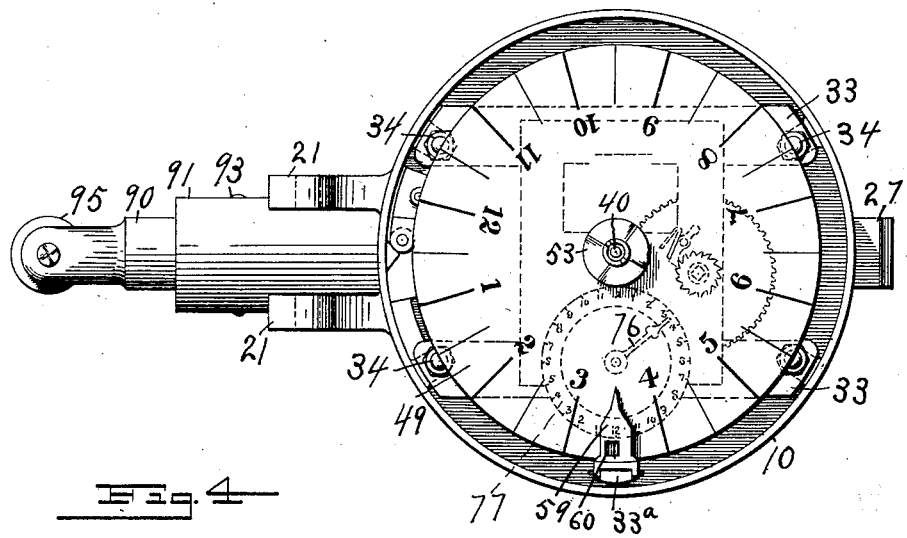
Figure 5:
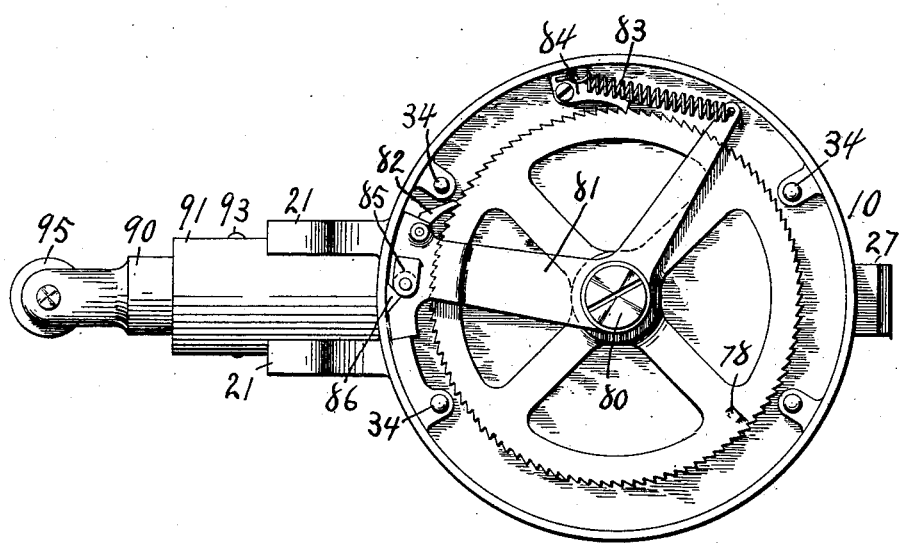
Figure 12:
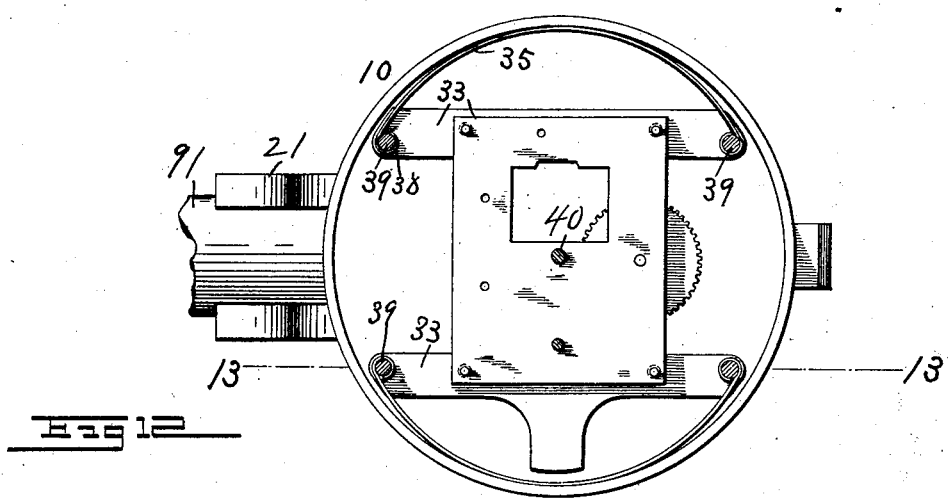
Figure 13:
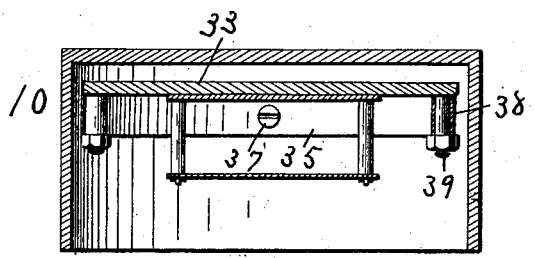
Figure 14:
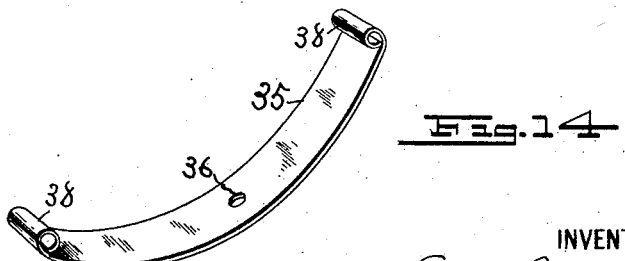

Figure 1 is a front elevation of my improved apparatus as applied to an axle of a vehicle. Fig. 2 is a plan view of the same. Fig. 3 is a sectional elevation of the apparatus, showing it on an enlarged scale. Fig. 4 is a face view of the apparatus with the cover removed. Fig. 5 is a face view of the apparatus with the cover and clock-train removed. Fig. 6 is a detail sectional elevation of a part of the mechanism, showing particularly the dial-piercing device and the means for operating it. Fig. 7 is a sectional elevation of parts of the dial-piercing mechanism. Fig. 8 is a sectional elevation of the fastening means for securing the dial to the arbor of the clock-train. Fig. 9 is a cross-section on the line 9 9 of Fig. 8. Fig. 10 is a detail perspective view of the sleeve forming a part of the dial-fastening device. Fig. 11 is a detail perspective view of the collar, which forms also a part of the dial-fastening device.

My recording apparatus is contained in a main drum-like case 10, the structure of which forms a part of my invention, and this case can be provided with any suitable means of securing it to a vehicle-axle. As shown, it has bolts 11, which straddle the axle 12, (see Fig. 2,) and the bolts are secured by suitable nuts to a plate 13. The case has a suitable cover 14, which is provided near its outer edge with a groove 15, adapted to receive the edge of the casing-wall, and in this groove is a gasket 16, so that a water-tight joint can be made. Near the center of the cover and projecting outward therefrom are ears 17, between which is pivoted, as shown at 18, the fastening and centering lever 19, which extends across the face of the case 10, being pivoted at one end, as shown at 20, between the ears 21 on one side of the case 10. The lever 19 is provided with a central seat 22, which engages the head of the bolt 23, this being screwed into the cover 14 and adjusted by means of a nut 24. It will be seen that this arrangement brings the strain upon the cover centrally thereon, so that all parts of the cover edge shall bear equally against the case 10, thus making a tight and uniform pressure all around the cover. At its free end the lever 19 terminates in a curved extension 25, which engages a corresponding extension 26 on the foot of the lock-case 27, which case carries an ordinary lock of any preferred form and at its upper end engages a lug 28, formed on the back wall of the casing 10. The lock-case 27 is pivoted at its lower end between the ears 30 on the case or casing 10, and when the parts 25 and 26 are placed in engagement and the lock-case turned back flat against the case 10 the lever 19 is drawn closely toward the case 10 and the cover 14 is held very securely. By reference to Fig. 3 it will be noticed that the lock has the usual bolt 31, operated by a key entering the keyhole 29 and engaging the lug 28.

Near the case or casing 10 is arranged a clock-train 32, like that described in my former patent. Any suitable time-keeping clock-train will answer, and the frame 33 of this clock-train is shown in Fig. 3, supported in the case 10, preferably by bolts or studs 34, which engage projecting parts of the frame.

The clock-train has the customary arbor 40, which corresponds in its movement to that of the hour-hand of a clock, and this carries the recording-dial, to be presently described. In Figs. 6 to 10 I have shown a special form of fastening device to secure the recording-dial to the arbor 40, so that the dial cannot accidentally get loose. The arbor 40 carries at its outer end a bushing 41, near the inner end of which is a flange 42 to limit the inward movement of the sliding sleeve 43 on the bushing, which sleeve has a flange 44 to abut with the recording-dial 49, and has a key 45, which slides in the keyway 46 of the bushing 41. This arrangement, it will be seen, permits the sliding of the sleeve and causes the sleeve and bushing to turn together. The sleeve 43 is pressed forward by a spiral spring 47, which is coiled around the sleeve 43 and presses against the flange 44, as shown clearly in Figs. 6 and 8. On the flange 44 are engaging pins 48, which are adapted to pierce the dial 49 and enter the curved slots 50 in the flange 51 of the collar 52. The object of these slots is to permit the necessary movement of the collar in fastening the dial, as presently described. The collar 52 has also a finger-piece 53 in the form of a flange, by which it may be turned. The collar 52 is also provided with inwardly-extending pins 54, which are adapted to enter the longitudinal slot 55 in the bushing 41, (see Fig. 10,) and then by being moved laterally engage the offsets 56 in the said bushing. Thus it will be seen a bayonet-joint is made which locks the collar 52, dial 49, sleeve 43, and bushing 41 together. In fastening the dial it is placed in position upon the bushing 41 and against the flange 44, the collar 52 is pushed on over the bushing with the slots 50 opposite the pins 48, and the collar and sleeve are then pushed inward against the tension of the spring 47 till the pins 54, sliding in the slot 55, come opposite the offsets 56, when the collar is given a slight lateral turn and the pins 54 are permitted to seat themselves in the offsets 56, thus completing the fastening operation.

The dial 49 I have not shown in great detail and no description is necessary, as it is like the one shown in my former patent, being marked to indicate the hours of the day and can be subdivided to the necessary extent.

The periphery of the dial moves between the guiding devices 51 and 59, which except for some slight details are like the corresponding parts of my former patent. The plate 57 is stationary, has a slot 58 for the passage of the dial pricking-needle 63, and is rigid on an arm 33$^a$ of the clock-frame. The guide-plate 59 is hinged, as shown in Fig. 6, is provided with a slot 60 (see Fig. 4) for the passage of the pricking-needle 63, and has at its lower end and behind its pivot the projecting lugs 61, (see Fig. 6,) which are pressed by the springs 62, (see Figs. 6 and 7,) so as to normally press the guide-plate inward against the dial, as in Fig. 6. The needle 63 is substantially as shown in my other patent, being connected by a joint 64 with the sliding shank 65, which at one end carries the antifriction-roller 66 and is normally retracted by the spring 67. The shank 65 is jointed, as shown at 68, to provide for the necessary up-and-down movement when the needle is shifted twice in every twenty-four hours, as described in the former patent. The shank 65 slides through a hole 69 in the shifting arm 70, which is movable radially with reference to the dial, so as to cause the needle 63 to be shifted at the proper time, and the shifting arm 70 is normally pressed inward by a spiral spring 71, which is arranged in a socket 72 in the part 33$^a$. The inner end of the shifting arm 70 terminates in a guide-finger 73, which moves through a guide 33$^b$ on the clock-frame 33 and is in contact with the cam 74, which, as in my former invention, at the end of twelve hours moves the shifting arm 70 against the tension of the spring 71 or permits the spring to move the shifting arm, and consequently the needle-shank, inward, as the case may be. This cam 74 has no new function, and it is carried by the spindle 75, which is geared to the clock-train and carries a hand 76, corresponding to the hour-hand of a clock, which hand moves opposite the dial 77, this being marked, as shown in Fig. 4, in a double series of numbers, running from one to twelve, and the dial and hand serve as an indicator to assist in properly setting the dial 49.

The needle-shank 65 is forced forward against the tension of the spring 77 by a cam 78 on the ratchet-wheel 79, which turns loosely on the stud 80, fastened to the back wall of the casing 10. Any other suitable means can be used for actuating the needle 63 and its shank 65; but this is a simple method and serves the purpose. The ratchet-wheel is moved forward tooth by tooth, as presently described, and, as shown in my former patent, can be set so as to cause the needle 63 to be advanced when any predetermined distance is traveled. The means for moving the ratchet-wheel is an improvement over that formerly shown and is as follows: On the stud 80 is a bell-crank 81, which at one end carries a pawl 82 to engage the ratchet-wheel 79, and the bell-crank is moved backward by a spring 83, attached to the opposite end of the bell-crank and to a convenient support, while a detent 84 (see Fig. 5) prevents any backward movement of the ratchet-wheel. On the first-mentioned arm of the bell-crank 81 is an antifriction-roller 85, (see Figs. 3 and 5,) which engages the pointed or inclined inner end 86 of the plunger 89, which has an enlarged portion 90, sliding in the stem 91 of the case or casing 10. The plunger 89 is slotted, as shown at 92, to receive the pins 93, which are held fast in the stem 91, and so limit the movement of the plunger, and the latter is normally pushed outward by the spring 94, which is coiled around the part 89 of the said plunger. At its outer end the plunger carries an antifriction-roller 95, which engages the cam 96 on the hub of the vehicle-wheel, as shown in Figs. 1 and 2.

The operation of this device is like that shown in my former patent. The clock-movement causes the dial 49 to be turned, and when the vehicle is in motion every rotation of the hub will move in the plunger 89, thus actuating the bell-crank 81 and ratchet-wheel 79, and when the cam 78 comes in contact with the roller 66 of the shank 65 it pushes the said shank forward and causes the needle 63 to pierce the recording-dial 49. Obviously the pricks in the dial will be near together or far apart, according as the vehicle is run rapidly or slowly, and thus a record is kept of the vehicle movements. The needle will be automatically shifted, as already described, every twelve hours, so that a continuous twenty-four-hour record is provided for.

As above remarked, the novel features of this case relate to improvements which have grown out of my former invention and which will be specifically pointed out in the following claims.

Having thus fully described my invention, what I claim as new, and desire to secure by Letters Patent, is—

1. In an apparatus of the kind described, the combination with the clock-train arbor, of a sliding sleeve thereon, said sleeve having pins to engage a dial, a collar adapted to slip on over the arbor and abut with the sleeve, and means as a bayonet-joint for securing the collar in place.

2. In an apparatus of the kind described, the combination with the clock-train arbor, of a bushing thereon, a sliding sleeve on the bushing, said sleeve having a flanged end with pins thereon, and a collar adapted to slip on over the bushing, said collar having slots to receive the aforesaid pins and having a locking device to secure it to the bushing.

3. In an apparatus of the kind described, the combination with the clock-train arbor, of a bushing secured thereto, a sleeve held to slide on and turn with the bushing, said sleeve having a flange with pins thereon, means as a spiral spring to press the sleeve forward, a collar adapted to fit on over the bushing and provided with slots to receive the aforesaid pins, and means as the curved slot in the bushing and the pins on the collar to fasten the collar and bushing together.

4. In an apparatus of the kind described, the combination with the pricking-needle, the clock-train, and the dial-guiding device, of the shifting arm movable radially in relation to the clock-train arbor, a guiding device for the arm, and a cam driven by the clock-train and engaging the shifting arm to move it.

5. In an apparatus of the kind described, the combination with the dial-pricking mechanism, the main case, and the ratchet-wheel movable in the case and arranged to actuate the pricking mechanism, of a swinging lever pivoted opposite the ratchet-wheel, a pawl carried by the lever to engage the ratchet-wheel, and a sliding plunger movable through the wall of the case, said plunger being adapted to engage and actuate the aforesaid lever.

6. In an apparatus of the kind described, the combination with the main case and the ratchet-wheel therein, of the spring-repressed lever journaled opposite the ratchet-wheel and engaging the same, a plunger slidable in and out through the wall of the case, and means as the inclined end on the plunger and the roller on the lever for actuating the latter.

In testimony whereof I have signed my name to this specification in the presence of two subscribing witnesses.

FRANK BAYERDOERFER.

In presence of—
THERON DAVIS,
W. B. HUTCHINSON.